United States Patent [19]

Morimoto et al.

[11] B 3,998,739
[45] Dec. 21, 1976

[54] APPARATUS FOR FILTRATION

[75] Inventors: Shinichiro Morimoto, Yokohama; Osamu Abe, Kawaguchi, both of Japan

[73] Assignee: Kurita Water Industries Limited, Osaka, Japan

[22] Filed: July 29, 1974

[21] Appl. No.: 492,716

[44] Published under the second Trial Voluntary Protest Program on March 2, 1976 as document No. B 492,716.

[30] Foreign Application Priority Data

Aug. 2, 1973 Japan .............................. 48-86345
Aug. 2, 1973 Japan .............................. 48-86346

[52] U.S. Cl. .............................................. 210/189
[51] Int. Cl.² .............................................. B01D 23/10
[58] Field of Search ............. 210/79, 80, 106, 108, 210/189, 269, 275, 280, 33

[56] References Cited

UNITED STATES PATENTS

| | | | |
|---|---|---|---|
| 1,620,431 | 3/1927 | Bramwell | 210/189 |
| 1,861,295 | 5/1932 | Bramwell | 210/189 |
| 2,801,966 | 8/1957 | Mertes et al. | 210/189 X |
| 3,272,335 | 9/1966 | Nettel | 210/189 |
| 3,550,774 | 12/1970 | Hils | 210/189 |
| 3,673,085 | 6/1972 | Minart | 210/189 |
| 3,767,048 | 10/1973 | Prengemann | 210/189 |
| 3,798,159 | 3/1974 | Kisbocskol | 210/189 |

Primary Examiner—Theodore A. Granger
Attorney, Agent, or Firm—Oblon, Fisher, Spivak, McClelland & Maier

[57] ABSTRACT

An apparatus for filtration comprises a filtration column having an inner cylindrical compartment and an outer jacket compartment disposed in such a relationship that the outer jacket compartment encloses the inner cylindrical compartment and the space interposed between the inner cylindrical compartment and the outer jacket compartment is filled with a granular substance as filtering material to form a filter bed, a means for feeding a liquid subjected to treatment to said filtration column and a means for discharging the treated liquid from the filtration column, a washing column adapted to wash the filtering granules which have served the purpose of filtering the said liquid the filtration column and a means for circulating said filtering granules between said filtration column and the washing column and also allowing the granular filtering material to fill said space so as to form a new filter bed within the filtration column.

3 Claims, 6 Drawing Figures

APPARATUS FOR FILTRATION

BACKGROUND OF THE INVENTION

This invention relates to an apparatus for filtration wherein a liquid containing a suspended substance is filtered through a filter bed formed of a packed granular filtering material and, when the filterability of said filter bed is decreased to a fixed extent, the granular filtering material of the filter bed is washed to recover the filterability for filtration.

As a technique for accomplishing the filtration of a liquid by passing the liquid through a filter bed formed of a granular filtering material, there has been known a method whereby the liquid subjected to treatment is passed as a downflow through the filter bed formed of packed granular filtering material to a height of 60 to 200cm, for example.

In this method of filtration, the suspended matter in the liquid is seized mainly in the surface zone of the filter bed and, when the accumulation of the suspended matter in the surface zone has progressed to a certain degree, the overall filterability of the filter bed is abruptly degraded notwithstanding that the suspended matter has not been adsorbed appreciably in the inner zone of the bed. Consequently, the granular filtering material is required to be washed frequently. In the case of a liquid which contains a suspended matter at a high concentration, the filtration becomes extremely difficult. Further, this method requires a special member for supporting the filter bed in position and needs a large filtration tank which makes the filtration efficiency per unit quantity of the filtering material extremely low.

With a view to improving the filtering efficiency, there have been developed a two-bed downflow type filteration apparatus incorporating a filter bed formed of two layers of anthracite and sand and an upflow type filteration apparatus adapted to have a liquid passed as an upflow through the filter bed. These apparatuses have improved the filtering efficiency per unit quantity of filtering material.

In such static filter beds as mentioned above, however, the suspended matter which is seized by the filtering material forms mud balls. These mud balls persist despite all attempts to wash them away and consequently the filtered liquid is degraded in terms of purity.

Various methods resorting to forceful projection of water, aerial agitation and the like have found popular acceptance. Nevertheless, they possess a disadvantage that they are quite expensive and entail consumption of large volumes of water. They provide effects of a passing nature and fail to give a radical solution to the problem.

A principal object of this invention is to provide an apparatus for filtration which has high filtering efficiency per unit quantity of filtering material.

Another object of this invention is to provide an apparatus for filtration which permits easy removal of mud balls and enables the filtration to be efficiently carried out at all times.

Still another object of this invention is to provide an apparatus for filtration which is capable of providing highly efficient filtration to all kinds of liquids.

It is also an object of this invention to provide an apparatus for filtration which provides desired filtration continuously and with high efficiency at all times.

SUMMARY OF THE INVENTION

To attain the objects described above, the apparatus of the present invention has a filtration column which is provided, inside its vertical column, with an inner cylindrical compartment having its axis in the vertical direction, an outer jacket compartment concentrically enclosing said inner cylindrical compartment therewith, and a filter bed formed of a granular filtering material filling the space interposed between the outer jacket compartment and the inner cylindrical compartment, with a means for feeding the liquid subjected to treatment and a means for discharging the filtered liquid both connected to the inner cylindrical compartment and the outer jacket compartment and numerous perforations to permit the liquid to flow in radial directions, either outwardly or inwardly, from one of the compartments through the filter bed to the other compartment bored through the walls of the compartments at the portions respectively adjoining the filter bed. A washing column is disposed separately of the filtration column and it is connected to the top and the bottom of the filtration column each by means of a flow line. When the granular filtering material of which the packed filter bed is formed has its filterability degraded to a certain degree, the filter bed is disintegrated and the individual filtering granules are forwarded through the flow line into the washing column to be washed therein and, after the washing, the washed filtering granules are returned to the filtration column and packed therein to form a new filter bed again. In the course of filtration, certain amounts of granular filtering material and seized suspended matter from the liquid enter the inner cylindrical compartment and the outer jacket compartment. These intruders are removed through the openings which are formed at the bottom of the respective compartments.

The washing column of the present invention also incorporates a column which is composed of a storing barrel having a large inner volume and adapted to project the washing water and a washing head disposed on said barrel and possessed of a structure capable of precluding loss of the granules during the washing.

DETAILED DESCRIPTION OF THE INVENTION

The apparatus according to the present invention will be described with reference to FIG. 1 which shows one preferred embodiment of this invention.

In the diagram, 1 denotes a vertical column and 2 an inner cylindrical compartment which is disposed inside said vertical column 1, has its axis in the vertical direction and is provided in its side wall 2' with a multiplicity of perforations 3 for permitting passage of liquid and at the bottom with an opening 4. The reference numeral 5 denotes an outer jacket compartment which is disposed concentrically with the inner cylindrical compartment 2 so as to enclose this inner cylindrical compartment. This outer jacket compartment has its outer wall 5' formed of a part of said vertical column and is provided in its wall 5" facing the inner cylindrical compartment with a multiplicity of perforations 6 for permitting passage of liquid and at its bottom with an opening 7. A filtration compartment is formed in the space between the inner cylindrical compartment 2 and the outer jacket compartment 5 and it is packed with a granular filtering material such as sand, for example, to form a filter bed 8.

Pipes 9, 10, 11 and 12 are so connected to the outer jacket compartment or inner cylindrical compartment as to feed the liquid subjected to treatment or discharge the filtered liquid. As illustrated, these pipes are provided with valves 9', 10', 12', 12" and 12'''. By the operation of a pump P, the liquid can be fed as desired. It is seen from the diagram that when the valves 9' and 12''' are opened and the valves 12" and 10' are closed, the liquid is made to enter the outer jacket compartment via the pipe 9, pass the filter bed 8 and then enter the inner cylindrical compartment and finally advance through the pipes 11 and 12 to be discharged. When the valves 9' and 12''' are closed and the valves 12" and 10' are opened, the liquid is now caused to enter the inner cylindrical compartment via the pipes 12 and 11, pass through the filter bed 8, enter the outer jacket compartment and finally advance through the pipe 10 to be discharged. In either case, the liquid is made to flow in radial directions, either toward or away from the center, through the filter bed between the outer jacket compartment and the inner cylindrical compartment. The inventors have confirmed through experiments that when the flow of the liquid is established in an outward direction, the pressure difference between the outer jacket compartment and the inner cylindrical compartment which is required to be small for satisfactory filtration is smaller than when the flow is made in the inward direction.

Figure 2:
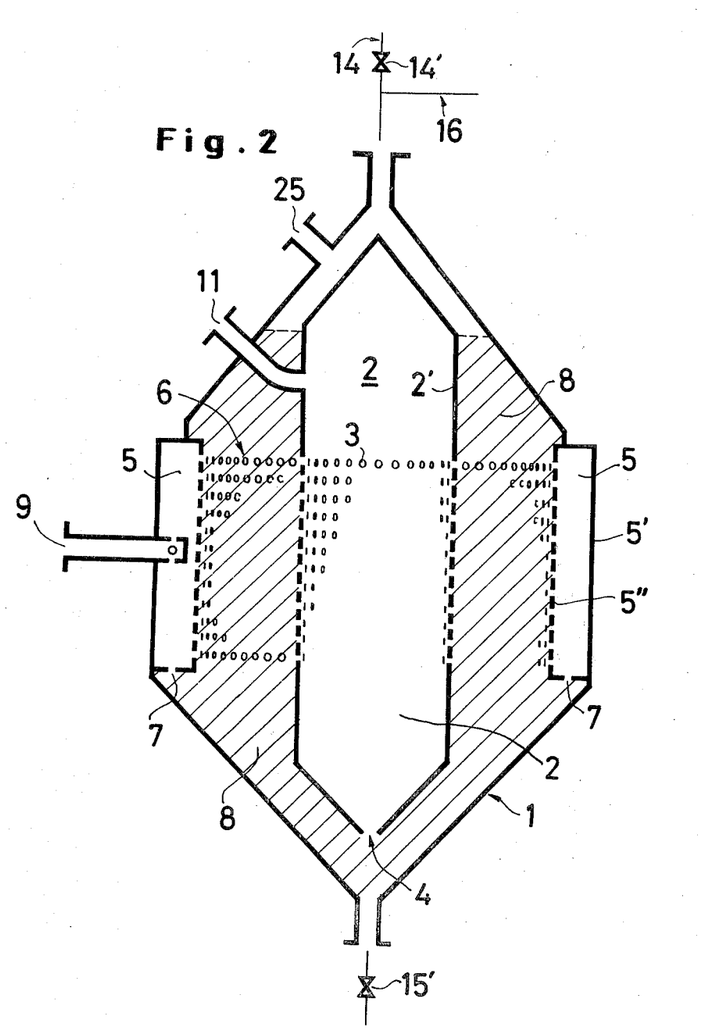
FIG. 2 is a longitudinal cross section illustrating one embodiment of the filtration column.

FIG. 2 is a detailed diagram illustrating one embodiment of the filtration column. The vertical column 1 is a vertically elongate cylinder having a vertically elongate hexagonal cross section. Inside this cylinder 1 is disposed the inner cylindrical compartment 2. The outer jacket compartment 5 is formed at the cylindrical portion of the vertical column 1. The perforations 3 formed in the inner cylindrical compartment are distributed in a limited zone which corresponds in height to the zone in the outer jacket compartment in which the perforations 6 are distributed. The outer jacket compartment 5 the length of which is substantially smaller than the axis of the inner cylindrical compartment is formed on the inside of the column. In this illustrated embodiment, the perforations 3 and 6 for passage of liquid are distributed all around the opposed side walls of the inner cylindrical compartment and the outer jacket compartment. Denoted by 9 is a pipe for introducing or discharging liquid into or out of the outer jacket compartment and denoted by 11 is a pipe for introducing or discharging liquid into or out of the inner cylindrical compartment.

Figure 3:
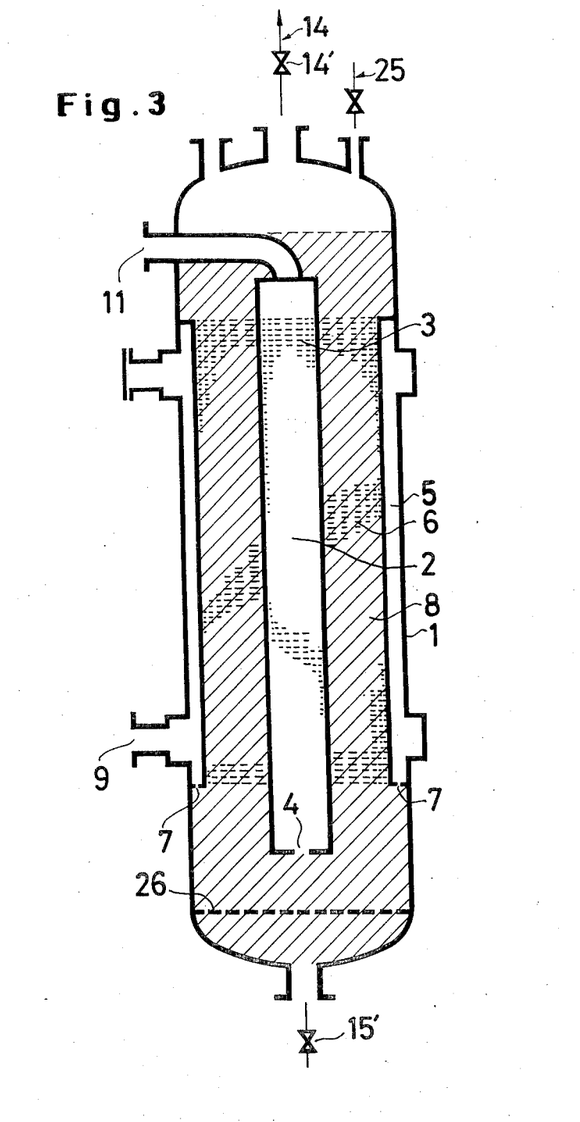
FIG. 3 is a longitudinal cross section illustrating another embodiment of the filtration column.

FIG. 3 is a diagram illustrating another embodiment of the filtration column for use in the apparatus of this invention. The perforations 3 and 6 which are intended to permit passage of the liquid under treatment may be circular as illustrated in FIG. 2 or in any other shape such as of slits like those shown in FIG. 3. The perforations are desired to have the largest permissible size that prevents entry of the granular filtering material into the outer jacket compartment or the inner cylindrical compartment through these perforations. By increasing the size of these perforations, possible resistance offered to the passage of liquid in the course of filtration and to the passage of washing water in the course of washing operation given to the defiled filtering granules can be decreased to facilitate passage of liquid. When the perforations intended for passage of the liquid are formed in a circular shape, their diameter may be slightly larger than that of the filtering granules in use. This is because the individual granules adjoining each perforation are so aggregated as to form a bridge over the perforation and consequently they are scarcely able to go through the perforation.

In a long duration of service of the filtration apparatus, certain amounts of broken segments of the filtering granules and suspended matter of the liquid under treatment find their way into the inner cylindrical compartment or the outer jacket compartment and accumulate therein. The openings 4 and 7 formed respectively in these compartments serve to remove the accumulated intruders, permitting the operation to be continued without interruption.

Experimentally it has been found that the thickness in the direction of radius of the filter bed 8 is required to fall in the range of from 20 to 60cm and that the thickness in the vertical direction of the bed is required to be greater by at least said thickness in the direction of radius than the vertical length of the zones in which the perforations are distributed in the inner cylindrical compartment and the outer jacket compartment. If the vertical length of the filter bed 8 is smaller than is required, then a part of the liquid which has entered the filter bed 8 through the perforations in either of the two compartments flows through the surface zone of the filter bed where less resistance is offered. This part of the liquid, therefore, enters the other compartment while in a state not thoroughly filtered. Occurrence of such an insufficiently filtered portion of the liquid results in a reduction in the overall filtering efficiency of the operation.

The apparatus of the present invention has extremely high filtering efficiency. The filtering capacity of this apparatus can be increased by proportionally enlarging the vertical lengths of the outer jacket compartment and the inner cylindrical compartment, elongating the zones containing the perforations in their respective walls and increasing the height of the filter bed.

The filter bed has its filterability degraded sharply after the bed has been defiled to a certain extent with the suspended matter seized from the liquid. The progress of the defilement of the filter bed to this extent is easily detected by the symptoms that the pressure drop between the inner cylindrical compartment and the outer jacket compartment increases and the water filtered through the filter bed begins to exhibit inferior quality.

The apparatus according to this invention also includes a means for treating the filter bed so as to regain its original filterability. This means is the washing column.

Figure 1:
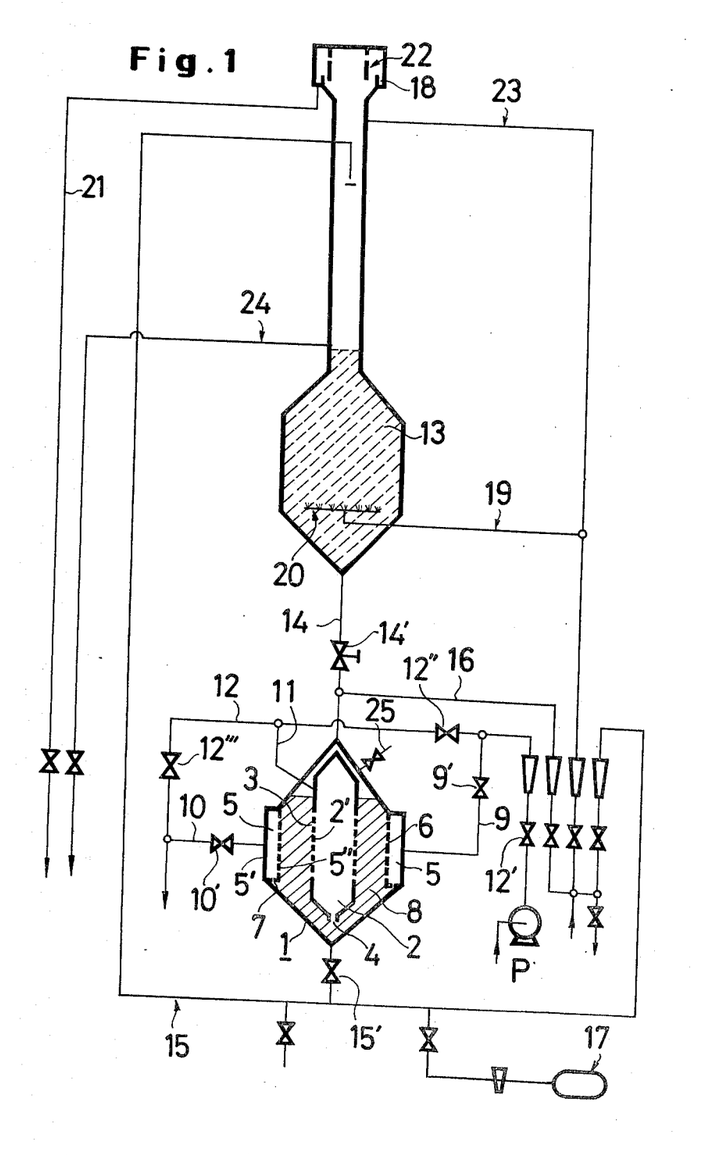
FIG. 1 is a system diagram illustrating one embodiment of the apparatus according to this invention.

In the diagram of FIG. 1, 13 denotes the washing column. The bottom of the washing column and the top of the filtration column are connected to each other by a pipe 14 containing a valve 14', while the top of the washing column and the bottom of the filtration column are connected by a pipe 15 containing a valve 15'. To the lower side of the valve 14' in the pipe 14, a pipe 16 for delivery of forced flow of water is connected. The pipe for the forced flow of water may otherwise be directly connected to the filtration column in which the filter bed is formed. By the term "pipe for the forced flow of water" is meant a path through which water under pressure is introduced into the filter bed after the filtering capacity of individual filtering granules has been degraded so as to disintegrate the filter bed and wash out the filtering granules. This special pipe serves its purpose best when it is laid independently of the other pipes as described above. If circumstances permit, the pipe 9 which is connected to the other jacket compartment or the pipe 11 which is connected to the inner cylindrical compartment may be so designed as to serve concurrently an additional purpose of establishing a path for the forced flow of water. For this purpose, it is necessary that the relevant valves be so operated as to allow the liquid under treatment to flow into the pipe 15 connected to the washing column instead of flowing between the outer jacket compartment and the inner cylindrical compartment. In this connection, if the perforations 3 and 6 are of a small diameter, then the pressure drop is increased and consequently the efficiency is degraded. A concrete example of the washing operation will be described with reference to FIG. 1. While the filtering operation is in progress, the valves 14' and 15' contained in the pipes leading to the washing column are kept closed. The washing operation is started after the filtering operation has been suspended. To be specific, the forced flow of water to the filter bed is established by first opening the valve 15' at the bottom of the filtration column and then introducing water under pressure into the filter bed. This water under pressure disintegrates the filter bed into the individual filtering granules and carries the granules through the valve 15' and the pipe 15 into washing column 13. The granules, while being thus transferred, are stirred and rubbed against one another so that the suspended matter now adhering to their surface is removed. In the diagram of FIG. 1, 17 denotes a means for mixing air. It is provided with an ejector, a compressed air source, etc. When air is injected into the pipe 15 through which exhausted filtering granules are being transferred together with water under pressure, it serves the purpose of smoothening the flow of granules within the pipe, enhancing the agitation of granules in motion and rendering perfect the separation of adhering suspended matter from the surface of the granules. This transfer of granules from the filtration column to the washing column can be accomplished more smoothly by allowing some water other than the water under pressure being delivered to the filter bed to be added to the path after the filter bed. In this case, the aforementioned injection of air into the water being used for the transfer of granules may prove effective when it is made with respect to this additionally introduced water.

The water which is under pressure and introduced directly into the filter bed and the other water which is added to the path after the filter bed may suitably be supplied from their proper sources.

The washing column 13 is provided at its top with an overflow trough 18 and at the lower level thereof with a projecting means 20 which is connected to a cleaning water pipe 19. The projecting means is desired to be one of a type designed to project water upwardly. The granules forwarded together with water through the pipe 15 are fed downwardly from the top of the washing column and they are washed as they are brought into counterflow contact with the water being projected upwardly through the projecting means. Consequently, the adhering suspended matter is removed from the surface of the granules, entrained by the rising water, caused to overflow trough 18 and discharged together with the water via the pipe 21.

During the washing, forced flow of water under pressure is established to the filter bed as described above. As a result, the water under pressure naturally finds its way also into the inner cylindrical compartment and the outer jacket compartment. On entering these compartments, the pressurized water purges out of the compartments those granules and suspended matter of the liquid under treatment which have entered and accumulated in the compartments, with the result that the foreign matter is simultaneously transferred from the inner cylindrical compartment and the outer jacket compartment into the washing column.

The washing column 13 operates efficiently when it has a structure in which the upper half portion is slender and the lower half portion is large as illustrated in FIG. 1. The washing water discharged upwardly through the projecting means 20 has a low ascending speed in the lower half portion and a high ascending speed in the upper half portion. As a result, the granules are effectively washed as they are descending through the upper half portion and they are accumulated and stored in the lower half portion respectively of the washing column 13. A baffle plate enclosure 22 adapted to prevent granules from scattering may be disposed around the trough 18 to advantage.

When the washing operation is completed, the valve 15' is closed and the valve 14' is opened to permit the washed granules in the washing column to be transferred through the pipe 14 into the filtration compartment formed between the outer jacket compartment and the inner cylindrical compartment, so that the granules will fill the filtration compartment to form a new filter bed therein. In the case of a system wherein the washing column is positioned above the filtration column as illustrated in FIG. 1, the transfer of the washed granules from the washing column to the filtration column is effected by virtue of gravitational attraction. In the case of a system in which the transfer of washed granules cannot be accomplished by gravitational attraction, it can alternatively be effected by pouring water under pressure downwardly from the top of the washing column for thereby forcing the granules out of the washing column into the filtration column. For this transfer to be effective, it is necessary that the trough be formed in a structure capable of tight closure and it be kept closed tight while the granules are being transferred. In the diagram of FIG. 1, the pipe 23 is intended for introduction of water under pressure.

Alternatively, the washing column and the filtration column may be constructed integrally to each other. The reference numeral 24 denotes a water discharge pipe for the washing column. This pipe is used for the purpose of discharging water when necessary. Denoted by 25 is an outlet which serves to release air and overflow water from the filtration column. The total washing of the filter bed may be carried out at fixed intervals. Where the duration of interruption of the filtering operation by the washing is desired to be shortened, however, it is permissible that the washing be carried out on a fraction such as, for example, 10 to 30 percent of the whole filter bed at a time. The filtration column shown in FIG. 3 is provided at its bottom with a perforated plate 26. This perforated plate 26 is intended to uniformize the downward transfer of granules. The plate 26 performs effectively when the aperture ratio thereof is fixed in the neighborhood of 10 percent.

Figure 4:
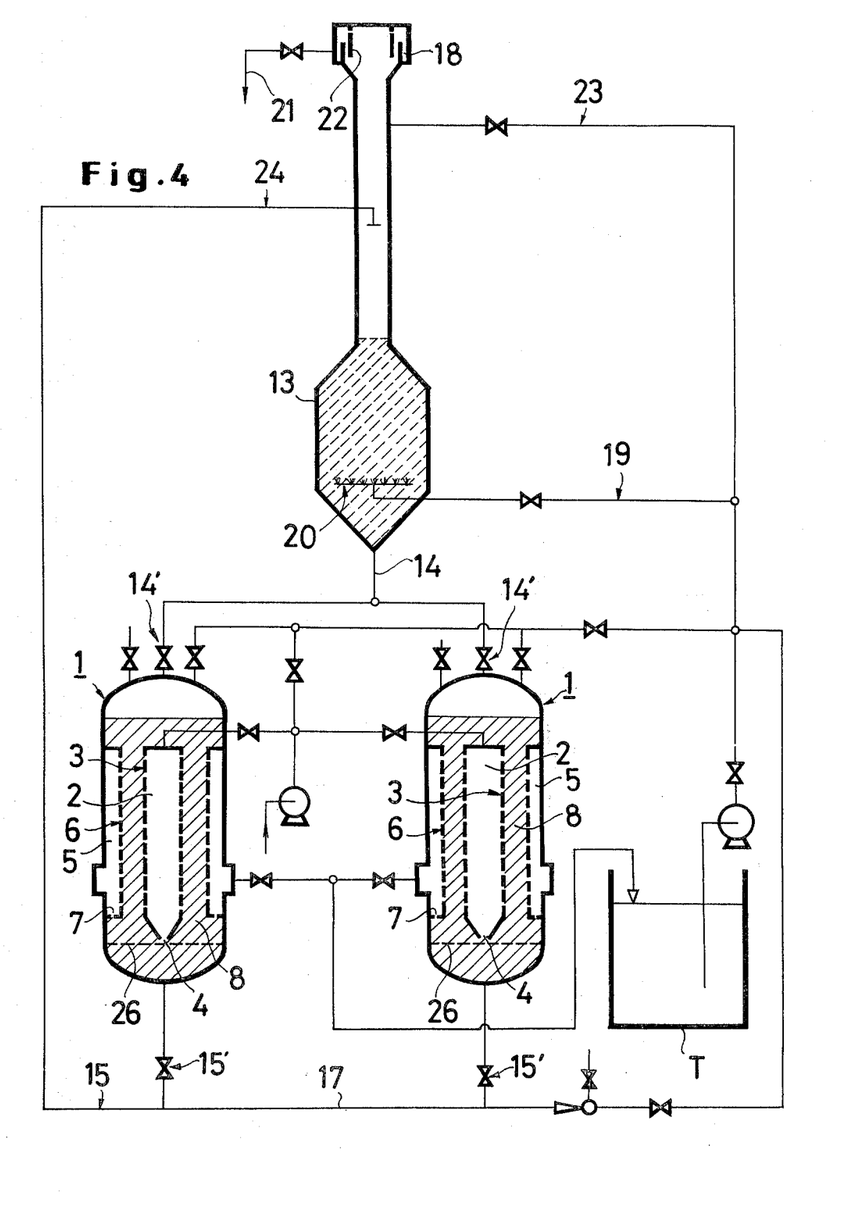
FIG. 4 is a system diagram illustrating another embodiment of the apparatus according to this invention.

FIG. 4 shows an embodiment of the apparatus according to this invention, wherein a plurality of filtration columns are so arranged and the washing and filtering operations to be performed in these columns are so staggered that the system as a whole enables the filtration to be carried out continuously. In the diagram, T denotes a liquid storage tank. As illustrated, the liquid storage tank has a piping which provides paths for transfer of granules from the filtration column to the washing column and for transfer thereof from the washing column to the filtration column. A multiplicity of filtration columns may be disposed in one system, so that the filtering granules of the filter beds in these columns may be subjected to regeneration one after another, keeping at least one of the columns in service for filtration at all times.

Figure 5:
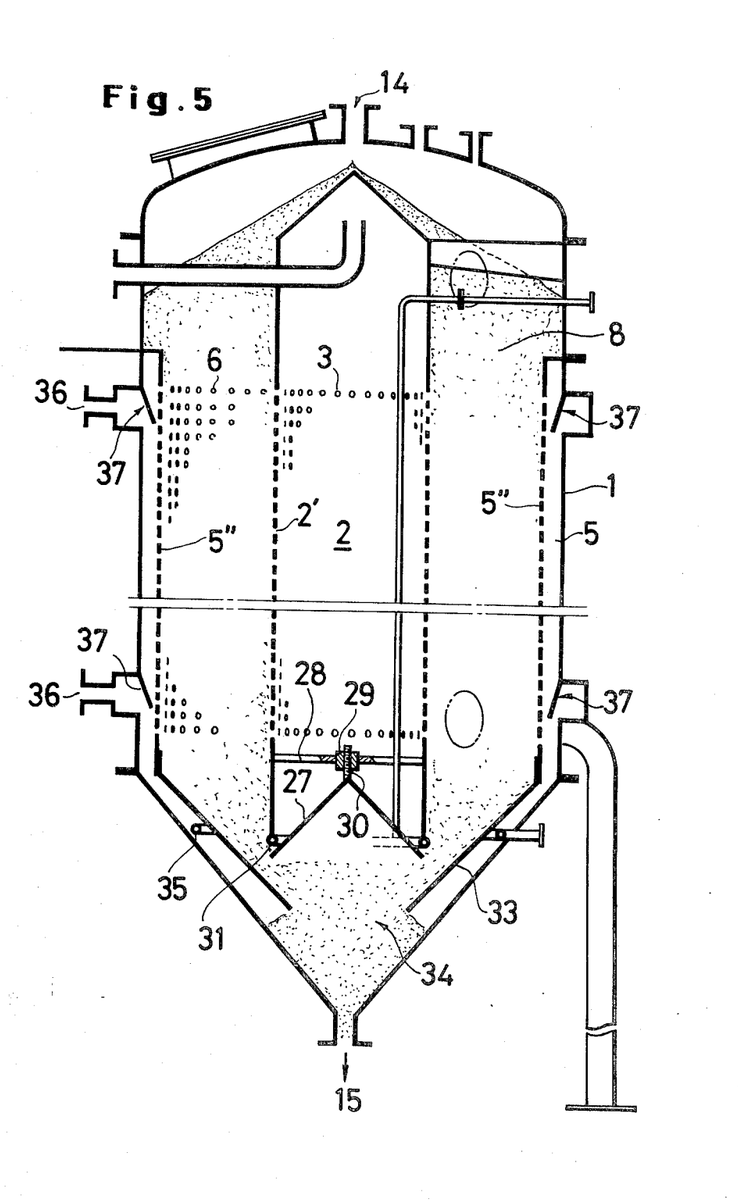
FIG. 5 is a longitudinal cross section illustrating another embodiment of the filtration column.

The apparatus of this invention can be applied to filtration of all kinds of liquids. If the suspended matter carried in a given liquid is such that it contains a water treating agent such as a coagulant and therefore has viscosity, there is a possibility that small portions of filtering granules which have separated from the filter bed and found their way into the inner cylindrical compartment 2 or the outer jacket compartment 5 will mingle with the suspended matter to give rise to solid particles. In such a case, the solid particles escape being removed in the course of washing operation and remain and gradually accumulate in the respective compartments, throwing hindrances in the way of filtration. FIG. 5 shows one embodiment of the filtration column of the present invention which is specifically adapted to preclude formation of such solid particles.

Inside a vertical column proper 1 there are concentrically disposed an inner cylindrical compartment 2 having a multiplicity of perforations 3 respectively for permitting passage of liquid respectively bored through the side wall 2' thereof and an outer jacket compartment 5 having a multiplicity of perforations 6, for permitting passage of liquid, formed through the inner wall 5" thereof. The inner cylindrical compartment 2 has an open lower end which has a circular cross section. A bottom member 27 which is coaxial relative to the inner cylindrical compartment and has a conical shape is disposed across a space from said circular lower end. Therefore, the shape of the filtration compartment space between the bottom member and the lower end of the inner cylindrical compartment is annular.

Radial arms 28 are attached to the inside at the lower section of the inner cylindrical compartment and a member 29 possessing a female screw is supported at the center of the radial arms.

A male screw 30 is attached to the apex of the conical bottom 27 and this male screw is held in engagement with said female screw. Because of the construction just described, the bottom member 27 can be rotated around its axis and, because of the rotation, can be adjusted in its vertical height. This variability in the height of the bottom member permits the size of the annular opening formed between the lower end of the inner cylindrical compartment and the conical bottom member to be adjusted when necessary. Since the area of the annular opening can be adjusted so as to suit the nature of the particular liquid subjected to treatment, extraneous matter of any form stagnating within the inner cylindrical compartment can be removed thoroughly in the course of washing.

In the diagram, 31 denotes an air projecting pipe. Compressed air released through this pipe serves the purpose of disintegrating all solid matter produced within the inner cylindrical compartment. In a commercial version of the apparatus according to this invention, this air projecting pipe 31 may be disposed as occasion demands.

Now an explanation will be made of the internal structure of the outer jacket compartment adapted to provide removal of solid particles formed within the compartment.

In the diagram, the outer jacket compartment has an open lower end and the lower end of the cylinder 5" constituting the inner wall of the outer jacket compartment is connected to a guide barrel 33 which is adjustable in height. Consequently, a conical annular opening can be formed between the lower side of the guide barrel 33 and the inner surface of the bottom of the column. In the diagram, the lower end of the inner cylindrical compartment extends below the level of the lower end of the cylinder 5" constituting the inner wall of the outer jacket compartment and approaches the bottom of the vertical column. The guide barrel 33 has the shape of an inverted, truncated cone and has an opening below the level of the bottom of the filter bed. For the purpose of washing, therefore, the filtering granules making up the filter bed are passed through the space formed between the lower section of the inner cylindrical compartment and the inner surface of the guide barrel and then through the opening 34 at the lower end of the guide barrel and finally discharged through the lower opening of the column. In the meantime, water under pressure is delivered also into the outer jacket compartment, so that the solid particles formed inside this compartment are purged out through the open end thereof. This means that in the course of washing, all substances accumulated inside the inner cylindrical compartment and the outer jacket compartment can be completely removed simultaneously when the filtering granules of the filter bed are washed out of the filtration compartment. The guide barrel 33 has an additional function of preventing the liquid, during the filtering operation, from short-cutting the open spaces below the lower ends of the outer jacket compartment and the inner cylindrical compartment instead of passing through the perforations formed on the walls of the outer jacket compartment and inner cylindrical compartment.

The solid particles accumulated inside the outer jacket compartment can be effectively disintegrated by means of an air blowing pipe 35 which may be disposed between the guide barrel 33 and the bottom of the column.

In order for the guide barrel to be movable relative to the cylinder constituting the inner wall of the outer jacket compartment, it is sufficient that vertically elongate slits be formed on one of the adjoining walls and screws be planted on the other wall at the corresponding positions so that the guide barrel will be vertically moved within the length of the vertically elongate slits and fastened at a desired level within that range by tightening the screws.

By use of the inner cylindrical compartment and the outer jacket compartment having the constructions according to this invention, the extraneous matter produced within these compartments can be purged thoroughly during the washing without any hindrance to the filtering operation.

In the diagram, 36 denotes a liquid inlet to the outer jacket compartment and this inlet is provided with a baffle plate 37. While the liquid to be filtered is being introduced through the inlet, the baffle plate serves the purpose of dispersing the incoming liquid into the interior of the outer jacket compartment and, while the liquid is being discharged from the inner cylindrical compartment, it serves the purpose of preventing the filtering granules of the filter bed from entering the compartment and further from being sucked into the inlet together with the liquid under filtration.

As noted already, the system employed by this invention for washing the filtering granules which have been delivered in the form of a current by combined use of air and water is one of the backwash type provided at the bottom with an outlet for projecting the washing water and at the top with an overflow inlet for receiving the spent washing water. If this system is so arranged that the air, water and filtering granules may flow into the water within the system, then those filtering granules which have lower specific gravities are caused to be carried by the air ascending through the water and eventually released through the overflow inlet.

To overcome this disadvantage, this invention causes the discharge end of the delivery pipe to open into the space above the water level within the system so that the filtering granules will be prevented from being carried by the ascending air and lost through the overflow inlet. This arrangement will be described with reference to FIG. 6 which represents one embodiment of this invention.

Figure 6:
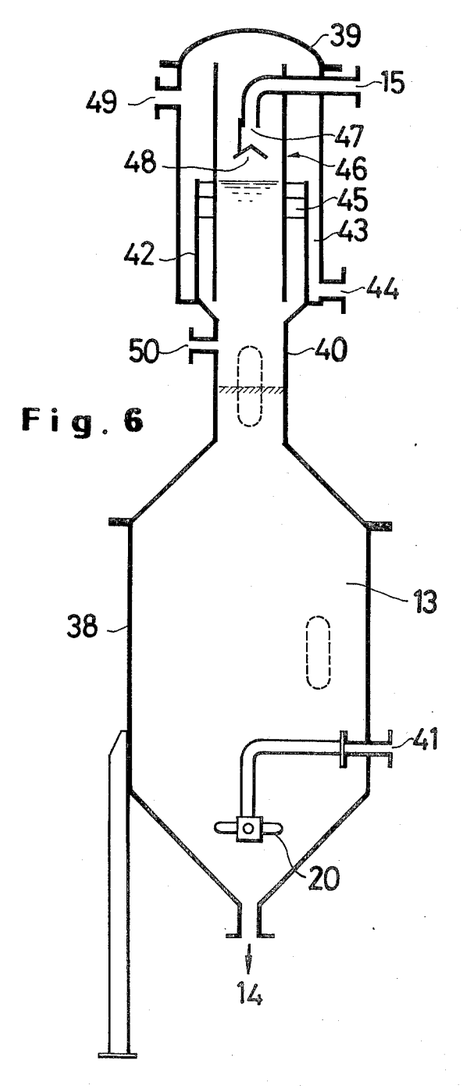
FIG. 6 is a longitudinal cross section illustrating one embodiment of the washing column.

The washing column 13 comprises a storage barrel 38 having a large inner volume and a washing head 39 disposed adjoiningly on said barrel 38 and further incorporates a neck 40 between the barrel 38 and the head 39. If the circumstances permit, the neck 40 may be eliminated by having the head 39 disposed directly on the barrel 38.

At its bottom, the barrel 38 is provided with a projecting means 20 for washing water, so that the projecting means 20 will project the washing water which is introduced through the inlet 41. The projecting means 20 is desired to release the washing water in the upward direction.

Inside the head 39 there is concentrically disposed an outer cylinder 42 of a small height. The tubular space intervening between the outer shell of the head 39 and said outer cylinder 42 is provided with a bottom so as to provide an overflow inlet 43. The overflow inlet receives the spent washing water which has overflowed the outer cylinder 42 and discharges it through the outlet 44. Inside said outer cylinder 42, an inner cylinder 46 of a large height is disposed concentrically and held in position by means of radial arms 45.

While the lower end of this inner cylinder 46 is flush with the lower end of the outer cylinder 42, the upper end of the inner cylinder 46 protrudes upwardly from the outer cylinder 42 and approaches the closed ceiling of the head 39.

A delivery pipe 15 penetrates the head 39 and the upper section of the inner cylinder 46 and reaches the center of the space enclosed with the inner cylinder, and the discharge end 47 of this delivery pipe 15 opens downwardly at a level higher than the upper end of the outer cylinder 42. The discharge end 47 of the delivery pipe may downwardly confront a conical baffle plate 48 so that the filtering granules discharged from said discharge end 47 will be caused to fall in all directions uniformly inside the inner cylinder. Further, the filtering granules are agitated while they are forced through the delivery pipe 15, and the air which is discharged in conjunction with the thrusting water and the delivery water via the discharge end 47 is released into the atmosphere through an air vent 49 which is formed in the ceiling of the head 39 or in the side wall of the head at a level higher than the upper end of the outer cylinder as illustrated in the diagram.

According to this embodiment of the invention, the water within the system is not allowed to rise above the level of the upper end of the outer cylinder 42 because the ascending water overflows the upper edge of the outer cylinder into the overflow inlet 43 and discharges through the outlet 44. Moreover, since the discharge end 47 of the delivery pipe 15 opens at a level higher than the upper end of the outer cylinder 42, the filtering granules which have been conveyed through the pipe fall from the discharge end 47 in conjunction with the water into the water held inside the inner cylinder and the air, upon release from the discharge end 47, ascends through the upper inner portion of the inner cylinder, departs from the inner cylinder through the opening between the inner cylinder and the ceiling of the head and finds its way into the atmosphere through the air vent 49 formed in the head. Because of this arrangement, the filtering granules falling from the discharge end 47 are prevented from being carried by the air to the exterior of the system and they are also protected by the inner cylinder against falling into the overflow inlet 43 to be carried away.

In the apparatus illustrated in the diagram, a space is interposed between the upper end of the inner cylinder and the ceiling of the head in order for the air ascending through the interior of the inner cylinder to find its way to the air vent. Alternatively, the release of the air through the air vent can similarly be effected by inserting a window through the upper portion of the wall of the inner cylinder and extending the upper end of the inner cylinder as far as the ceiling of the head so that the inner cylinder may be fixed in position by the ceiling of the head.

Consequently, the filtering granules which are conveyed by the combined motion of air and water are caused to fall into and accumulate inside the barrel 38 without being washed out of the system and the washing water which is projected through the projecting means 20 gives to the accumulated granules a required backwashing, while the spent washing water which now contains the extraneous substance removed from the surface of the granules overflows the upper edge of the outer cylinder into the overflow inlet 43 to be released out of the system. When the washing is completed, water is introduced through the inlet 50 disposed below the head or, specifically in the illustrated embodiment, at an upper level of the neck 40 and the lower end of the barrel 38 is opened, so that the incoming water forces out the washed granules. Since the washing column is connected to the filtration column as shown in FIG. 1 and FIG. 4, the granular filtering material which has been forced out of the barrel flows into the filtration column.

It is evident from the foregoing explanation that the use of the washing column having the construction described above in the filtration apparatus of this invention enables the granules forming the filter bed to be washed clean of the deposited extraneous matter at an extremely high efficiency without entailing any loss of granules. In the case of the continuous filtration apparatus which utilizes two alternately operable filtration columns as illustrated in FIG. 4, the operations of filtering and washing can be carried out more efficiently by having the said filtration columns set up as in the aforementioned construction.

The apparatus for filtration according to the present invention provides highly efficient filtration for all sorts of liquids, irrespective of the kind of suspended matter contained therein. When the granules constituting the filter bed have had their filterability degraded to a certain extent because of deposition thereon of the suspended matter from the liquid under treatment, the apparatus disintegrates the filter bed, washes the individual filtering granules clean of the deposited extraneous matter and re-assembles the granules to form a new filter bed. Thus, the concept underlying the filtration apparatus of this invention is entirely different from that of the conventional apparatus which accomplishes the washing of the filter bed by means of mere backwashing. This apparatus does not cause occurrence of mud balls and other similar phenomena and the water obtained after the filtration is of constant purity.

The apparatus has a simple construction and requires no special supporting base for the filtering granules. Further, since the filtration is effected by passing the liquid under treatment radially in the horizontal direction within the vertical column, the area available for filtration per unit floor area is large and the volume for filtration can be increased by increasing the height of column.

As the filtering material of which the filter bed is formed, use of any known material such as, for example, inexpensive sand will suffice for the purpose.

We claim:

1. An apparatus for filtration, which comprises in combination
   1 a filtration column consisting of
      1 a vertical cylinder,
      2 an inner cylindrical compartment disposed inside said vertical cylinder, erected so that the axis thereof falls in a vertical direction, provided in its side wall with a multiplicity of perforations for passage of liquid and possessed of an opening at the lower end
      3 an outer jacket compartment disposed so as to have said inner cylindrical compartment concentrically surrounded thereby, provided in the zone of its side wall corresponding to the perforated zone of said inner cylindrical compartment with a multiplicity of perforations for passage of liquid, constructed so that a part of the said vertical cylinder constitutes the outer wall thereof and possessed of an opening at the lower end,
      4 a filter bed having a granular filtering material constituting a filter bed packed in the space intervening between said inner cylindrical compartment and the outer jacket compartment and
      5 a means for delivering a liquid subjected to filtration and a means for discharging the filtered liquid, which means are connected to said inner cylindrical compartment and the outer jacket compartment so that the liquid will be passed in radial directions, either outwardly or inwardly, from one of said two compartments to the other,
   2 a washing column consisting of,
      1 a storage barrel having a large inner volume and provided with a means for projecting the washing water; and
      2 a washing head connected to and located above the upper portion of said storage barrel and provided therein with (a) a cylindrical outer wall whose upper end is closed; (b) an outer cylinder coaxially disposed inside said outer wall and connected to said outer wall at its bottom for thereby forming an annular empty portion closed at its bottom; (c) an inner cylinder coaxially disposed inside said outer cylinder and possessed of a greater height than said outer cylinder and open at both ends thereof; (d) a pipe for delivery of the liquid subjected to washing so disposed that the discharge end thereof opens at a level higher than the upper end of said outer cylinder; and (e) an outlet disposed at the lower portion of said outer wall for discharging the spent washing water overflowing said outer cylinder,
   3 flow paths connecting the upper end and the lower end of said filtration column respectively to said washing column so as to permit conveyance of the granular filtering material between the columns and
   4 a means adapted to cause the individual granules constituting said filter bed within said filtration column to be driven, while under simultaneous agitation, through the flow path into said washing column to be washed therein and convey the washed granules back to said filtration column in which they are packed to form a new filter bed.

2. The apparatus of claim 1, wherein the inner cylindrical compartment of the filtration column has an open lower end of a circular cross section and, across a space from the said lower end and concentrically relative to said inner cylindrical compartment, a conical bottom member is disposed in such a manner as to be adjustable in its vertical position, with said lower end and said bottom member being separated by an annular gap and the outer jacket compartment has an open lower end and, to the inside wall of said jacket compartment, a guide barrel possessed of an opening below said filter bed across a space from said vertical cylinder is disposed in such a manner as to be adjustable in its vertical position.

3. The apparatus of claim 1, wherein the perforations formed in the side wall of the inner cylindrical compartment and in the zone of the wall of the outer jacket compartment corresponding to the perforated zone of said inner cylindrical compartment have a diameter larger than the diameter of the filtering granules constituting the filter bed.

* * * * *